US009816265B2

(12) United States Patent
Vermeren

(10) Patent No.: US 9,816,265 B2
(45) Date of Patent: Nov. 14, 2017

(54) PRE-FABRICATED CONSTRUCTION PANELS

(71) Applicant: REDCO NV, Kapelle-op-den-Bos (BE)

(72) Inventor: Frans Vermeren, Buggenhout (BE)

(73) Assignee: Etex Services NV, Kapelle-op-den-Bos (BE)

( * ) Notice: Subject to any disclaimer, the term of this patent is extended or adjusted under 35 U.S.C. 154(b) by 0 days.

(21) Appl. No.: 15/023,184

(22) PCT Filed: Sep. 8, 2014

(86) PCT No.: PCT/EP2014/069083
§ 371 (c)(1),
(2) Date: Mar. 18, 2016

(87) PCT Pub. No.: WO2015/039913
PCT Pub. Date: Mar. 26, 2015

(65) Prior Publication Data
US 2016/0230382 A1    Aug. 11, 2016

(30) Foreign Application Priority Data

Sep. 19, 2013  (EP) ..................................... 13185249

(51) Int. Cl.
*E04B 1/00*   (2006.01)
*E04G 21/00*  (2006.01)
(Continued)

(52) U.S. Cl.
CPC ............ *E04B 1/7625* (2013.01); *B32B 3/085* (2013.01); *B32B 7/14* (2013.01); *B32B 13/02* (2013.01);
(Continued)

(58) Field of Classification Search
CPC ..... E04B 1/7625; E04B 1/7645; B32B 3/085; B32B 7/14; B32B 13/02; B32B 13/045;
(Continued)

(56) References Cited

U.S. PATENT DOCUMENTS 4,937,122 A * 6/1990 Talbert ...................... B32B 3/22
   428/120
4,937,990 A * 7/1990 Paquette ............... E04D 13/172
   52/199

(Continued)

FOREIGN PATENT DOCUMENTS

FR           2547335 A1    12/1984

*Primary Examiner* — Brian Mattei
(74) *Attorney, Agent, or Firm* — Dilworth & Barrese, LLP

(57) ABSTRACT

A pre-fabricated construction panel (100) for use on an external surface and/or as part of a building or construction is provided. The panel comprises at least a first layer (110) which is at least partially provided from thermally insulating material having a first surface, said panel comprising at least a second layer (120), said at least second layer being provided from fiber cement board said second layer having a second surface facing said first surface, said first and second layers being connected one to the other by a spacing means located between and adhering to said first and said second surface, which spacing means provides at least one interspace (140) between the first and second surface, said at least one interspace having at least two openings to the external of said panel for enabling air to flow into and out of the interspace towards the external of said panel. The thermally insulating material means material has a thermal conductivity (lambda) less than or equal to 0.05 W/mK.

20 Claims, 2 Drawing Sheets

(51) Int. Cl.

| | |
|---|---|
| *E04G 23/00* | (2006.01) |
| *E04B 1/76* | (2006.01) |
| *B32B 7/14* | (2006.01) |
| *B32B 13/02* | (2006.01) |
| *B32B 13/04* | (2006.01) |
| *E04F 13/00* | (2006.01) |
| *E04C 2/34* | (2006.01) |
| *E04C 2/288* | (2006.01) |
| *B32B 3/08* | (2006.01) |

(52) U.S. Cl.
 CPC .......... *B32B 13/045* (2013.01); *E04B 1/7645* (2013.01); *E04C 2/288* (2013.01); *E04C 2/34* (2013.01); *E04F 13/007* (2013.01); *B32B 2266/0278* (2013.01); *B32B 2307/304* (2013.01); *B32B 2419/00* (2013.01)

(58) Field of Classification Search
 CPC ...... B32B 2266/0278; B32B 2307/304; B32B 2419/00; E04C 2/288; E04C 2/34; E04F 13/007; E04F 13/0866

See application file for complete search history.

(56) References Cited

U.S. PATENT DOCUMENTS

| | | | | |
|---|---|---|---|---|
| 5,069,950 | A * | 12/1991 | Crookston, Sr. | E04D 13/172 428/156 |
| 5,369,926 | A * | 12/1994 | Borland | E04D 11/02 428/158 |
| 5,473,847 | A * | 12/1995 | Crookston | E04C 2/205 454/260 |
| 8,273,208 | B2 * | 9/2012 | Brinner | B32B 37/24 156/290 |
| 2007/0193150 | A1 * | 8/2007 | Carlson | E04F 13/0864 52/302.1 |
| 2010/0319288 | A1 * | 12/2010 | Morse | B32B 5/18 52/518 |
| 2012/0047844 | A1 * | 3/2012 | Walker | B32B 3/085 52/741.4 |
| 2012/0073223 | A1 * | 3/2012 | Wilson | E04F 13/0864 52/302.1 |
| 2012/0285116 | A1 * | 11/2012 | Walker | E04B 7/20 52/741.4 |
| 2013/0125487 | A1 * | 5/2013 | Power | E04B 1/70 52/302.3 |
| 2014/0115988 | A1 * | 5/2014 | Sievers | E04B 2/00 52/302.1 |
| 2015/0096248 | A1 * | 4/2015 | Tebo | E04D 13/17 52/302.3 |

* cited by examiner

PRE-FABRICATED CONSTRUCTION PANELS

This application is a 371 application of PCT/EP2014/069083, filed Sep. 8, 2014, the contents of which are incorporated by reference herein.

FIELD OF THE INVENTION

The present invention relates to pre-fabricated construction panels for use on an external surface and/or as part of a building or construction. The invention further relates to the use of such pre-fabricated construction panels.

BACKGROUND OF THE INVENTION

A pre-fabricated construction panel for use on an external surface and/or as part of a building or construction is disclosed in GB2479023B. The panel comprises a water repellant particulate board.

When fiber cement board is used, the fiber cement board shows at least two reasons for dilatation in the directions parallel to the fiber cement board surface.

When the fiber cement board is exposed to changing humidity, rain, etc., the fiber cement board will show a dilatation due to the changing humidity of the board itself. This is typically a reversible dilatation. Over time, carbonatation of the fiber cement board will cause a permanent dilatation as well.

During use of the pre-fabricated construction panel, the pre-fabricated construction panel may become curved or may crack due to internal tension implied by said dilatations.

SUMMARY OF THE INVENTION

It is an object of the present invention to provide pre-fabricated construction panels for use on an external surface and/or as part of a building or construction, which has improved properties during use.

According to a first aspect of the present invention, a pre-fabricated construction panel for use on an external surface and/or as part of a building or construction is provided. The panel comprises at least a first layer which is at least partially provided from, e.g. made of, thermally insulating material having a first surface, the panel comprising at least a second layer, the at least second layer being provided from fiber cement board, the second layer having a second surface facing the first surface, the first and the second layers being connected one to the other by a spacing means located between and adhering to the first and the second surface, which spacing means provides at least one interspace between the first and second surface, the at least one interspace having at least two openings to the external of the panel for enabling air to flow into and out of the interspace towards the external of the panel.

The thermally insulating material means material has a thermal conductivity (lambda) less than or equal to 0.05 W/mK. The thermally insulating material may have more preferred a thermal conductivity (lambda) in the range of 0.002 to 0.05 W/mK, more preferred in the range of 0.02 to 0.04 W/mK. This lambda is measured using the method ASTM C518.

The first layer may completely be provided from thermally insulating material.

The interspace hence allows air to circulate from the outside of the plate, into the interspace, and back outwards to the exterior of the plate. When the pre-fabricated construction panel is placed at the outside of a construction or building, the external air can flow through the interspace. The humidity of the fiber cement plate at the surface of the second layer facing the first layer can equilibrate with the external air, just as the surface of the second layer facing the exterior does.

As such less or no difference in humidity between the one and the other face of the fiber cement board is obtained, reducing the tendency to build up internal tensions or even bending of the fiber cement board. As such also the carbonatation of the fiber cement board at the surface of the fiber cement board facing the first layer can equilibrate with the side of the fiber cement board facing the exterior. Again less or no difference with regard to carbonatation between the two faces of the fiber cement board is noticed.

This interspace, when properly oriented during use, may allow infiltrating liquid to drain of out of the interspace.

The presence of the interspaces also prevents humidity to accumulate between the first layer partially or fully provided from thermally insulating material, and the second layer, e.g. in void spaces between the two layers in case which may exist in case the first and second layer are glued one to the other without the provision of such interspaces.

A further advantage is that the interspace works as a pressure equilibration system. Wind pressure exercised on the surface of the fiber cement side of the panel causes air to penetrate between the panels when mounted to cover walls.

The pressure of the wind pushed between two plates is equilibrated by the presence of the interspaces, thereby avoiding rain to penetrate in the cavities to a large extent.

A further advantage is that the interspaces facilitate demolition at the life-end of the panel. The fiber cement plate can more easily be removed from the thermally insulating material, which on its turn facilitated the separate recycling of the two materials.

According to some embodiments of the present invention, the average distance (T) from the first to the second layer along the at least one interspace may range from 2 mm to 10 mm.

More preferred this average distance, which can also be referred to as the average thickness T of the interspaces, may vary from 2.5 mm to 8 mm, such as mostly preferred between 3 mm and 6 mm, such as 3 mm, 3.5 mm, 4 mm, 4.5 mm 5 mm and 5.5 mm.

The total surface area of the projection of the first surface on the second surface is preferably about equal to the total surface area of the second surface.

According to some embodiments of the present invention, the total surface area of the projection of the interspaces on the second surface of the at least second layer may be 75% to 99% of the total surface area of the second surface The open space of the second surface of the at least second layer preferably is more than 75%, and most preferred more than 80%, expressed as % of the total surface area of the second surface of the second layer.

More preferred the total surface area of the projection of the interspaces on the second surface of the at least second layer is 96% to 99% of the total surface area of the second surface and as mostly preferred between 97% and 99%.

According to some embodiments of the present invention, the pre-fabricated construction panel may have a substantially rectangular shape having a first pair of substantially parallel sides and a second pair of substantially parallel sides, the length of the first pair of sides being smaller in comparison to the length of the second pair of sides, the spacing means being strips oriented at an angle with the first side between 0° and 60°, inclusive.

The adhesive may be provided in substantially straight lines from one side of the shape to an other side, typically an opposite side of a rectangular shape. As such interspaces are provided which have openings at both sides of the shape of the pre-fabricated construction panel.

Preferably the openings are provided in the sides of the pre-fabricated construction panel which are to orient upwards and downwards when the panel is used and placed on an external surface and/or as part of a building or construction. In case of a rectangular shaped pre-fabricated construction panel, this is typically the long sides of the rectangular shape. Once the pre-fabricated construction panel is installed, the upwards oriented interspaces facilitate the creation of draft between the two layers of the pre-fabricated construction panel.

When the orientation of the strips is under an angle of substantially 0° with the short side of the rectangular shape, i.e. the first side, the interspaces make upwards running corridors. More preferred this angle is between 0° and 60°, and most preferred between 40° and 50° such as about 45°. The so formed diagonal corridors allow the panel to be cut into smaller pieces, still ensuring sufficient intermediate adhering to the first and second surface. This inclined orientation also allows the panel to be suitable for installation independently the orientation (horizontal or vertical) of the short side of the panel.

According to some embodiments of the present invention, the pre-fabricated construction panel may have a substantially rectangular shape having a first pair of substantially parallel sides and a second pair of substantially parallel sides, the length of the first pair of sides being smaller in comparison to the length of the second pair of sides, the at least one interspace having an opening at both sides of both pair of substantially parallel sides.

The adhesive may be provided as blobs of adhesive spread preferably equally over the whole surface of the first and second layer. As such an interspace is provided which have openings towards all sides of the shape of the pre-fabricated construction panel.

The adhesive may be applied as thick adhesive stripes, an adhesive filament or blobs applied to one of the first or second layer, before the two layers are combined.

The interspacing means adheres to the two sides by means of an adhesive. The adhesive used can be a thermoplastic adhesive, however more preferred, suitable structural gluing is used. The adhesives typically are silicone-based or modified silicone polymers, e.g. silyl modified polymers (SMP) or modified silicone polymers (MS polymers)

Among lots of possible embodiments, the interspacing means may simply be adhesive beads provided between the two surfaces. Optionally, the interspacing means may comprise a rigid support, e.g. a metal or polymeric rigid bar, typically having a rectangular or square radial cross section, being provided with adhesive at least along the contact zone of this bar with the two surfaces. An alternative is that the bars are provided from partially compressible foam, e.g. from polyurethane, typically having a rectangular or square radial cross section, being provided with adhesive at least along the contact zone of this bar with the two surfaces.

Still in other embodiments, the interspacing means comprises a rigid or semi-rigid bar, e.g. from rubber (natural or synthetic) or polymeric material such as polyvinylchloride (PVC) having an adhesive along the contact zone with the two sides, next to which one or two adhesive beads are provided from structural gluing type adhesive. During curing of the structural gluing type adhesive, the bar ensured to sustain the positioning of the fiber cement plate in view of the thermally insulating material.

According to some embodiments of the present invention, the interspacing means may comprise adhesive beads being provided from a structural gluing type adhesive contacting the first and the second surface.

According to some embodiments of the present invention, the interspacing means may comprise a rigid or semi-rigid bar having an adhesive along the contact zone with the two sides, the bar contacting the first and the second surface, one or more adhesive beads are provided adjacent to the bar, the adhesive beads being provided from a structural gluing type adhesive contacting the first and the second surface.

According to some embodiments of the present invention, the fiber cement board may be provided with water repellant properties.

The term "water repellant properties" means that the board has a water take up of less than 1.5 ml after 48 h using the RILEM Test No 11.4 in horizontal application. Preferably the water take up is even less than 1 ml per 48 h according to this test.

The fiber cement board can be provided with water repellant properties by the use of additives in the fiber cement slurry during the production of the fiber cement board. Such additives typically are silicone based additives.

The fiber cement board can be provided with water repellant properties by applying a hydrophobic coating to the side of the fiber cement board which faces away from the first layer. Such coating may be provided by using repellant surface hydrophobation coating, e.g. a water based silane/silicone emulsion, e.g. the DOW CORNING® 520 dilutable water repellent.

According to some embodiments of the present invention, the thermally insulating material may be a rigid foam.

The thermally insulating material may be a layered material comprising at least one of expanded or extruded polystyrene, a phenol based foam, polyisocyanurate or polyurethane.

Alternatively or additionally, the thermally insulating material may be a layered material comprising two or more layers of expanded polystyrene (EPS), extruded polystyrene (XPS), polyisocyanurate (PIR) or polyurethane (PUR). Optionally the thermally insulating material may comprise, at one or both surfaces, a water impermeable sheet or layer of material, such as a sheet or layer of aluminum.

Typically the thickness of the layer provided from thermally insulating material is in the range of 3 to 10 cm, more preferably in the range of 4 to 8 cm such as in the range of 4 to 8 cm.

According to some embodiments of the present invention, the fiber cement board may be an autoclave cured fiber cement board.

The fiber cement board typically is provided by a so-called Hatschek process, using fiber cement slurry to make the cement board. The fiber cement board typically is made using a slurry comprises water, process or reinforcing fibers which both may be natural organic fibers (typically cellulose fibers) or synthetic organic fibers (polyvynilalcohol, polyacrilonitrile, polypropylene, polyamide, polyester, polycarbonate, polyethylene, etc.), cement e.g. Portland cement, limestone, chalk, quick lime, slaked or hydrated lime, ground sand, silica sand flour, quartz flour, amorphous silica, condensed silica fume, microsilica, metakaolin, wollastonite, mica, perlite, vermiculite, aluminum hydroxide, pigments, anti-foaming agents, flocculants, and other additives.

The "green" fiber cement board, after being made by the Hatschek-process, may be first pre-cured to the air, after which the pre cured board is further air cured until it has its final strength, or autoclave cured using pressure and steam, to give the board its final properties.

According to a second aspect of the present invention, a pre-fabricated construction panel according to the first aspect of the invention is used to provide an external surface of a building or construction. The pre-fabricated construction panel according to the first aspect of the present invention may be provided in front of an external surface, e.g. an existing wall, of a building or construction. The first layer may be facing towards this external surface of the building or construction, the second layer may be facing away from this external surface of the building or construction.

Optionally, though not necessarily, a finishing layer can be provided once the panel is installed, such as a layer of paint or plaster. This finishing layer may be provided on the surface of the second layer, facing away from the first layer.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

The same reference signs refer to the same, similar or analogous elements in the different figures.

DESCRIPTION OF ILLUSTRATIVE EMBODIMENTS

The present invention will be described with respect to particular embodiments.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could.

Furthermore, the particular features or characteristics may be combined in any suitable manner in one or more embodiments, as would be apparent to one of ordinary skill in the art.

Figure 1:
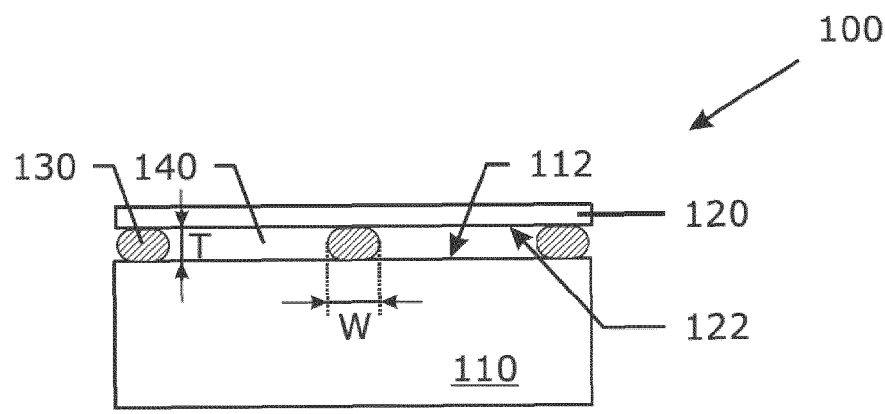
FIGS. 1 and 2 show schematically a side view and a top view of a pre-fabricated construction panel for use on an external surface and/or as part of a building or construction.
Figure 2:
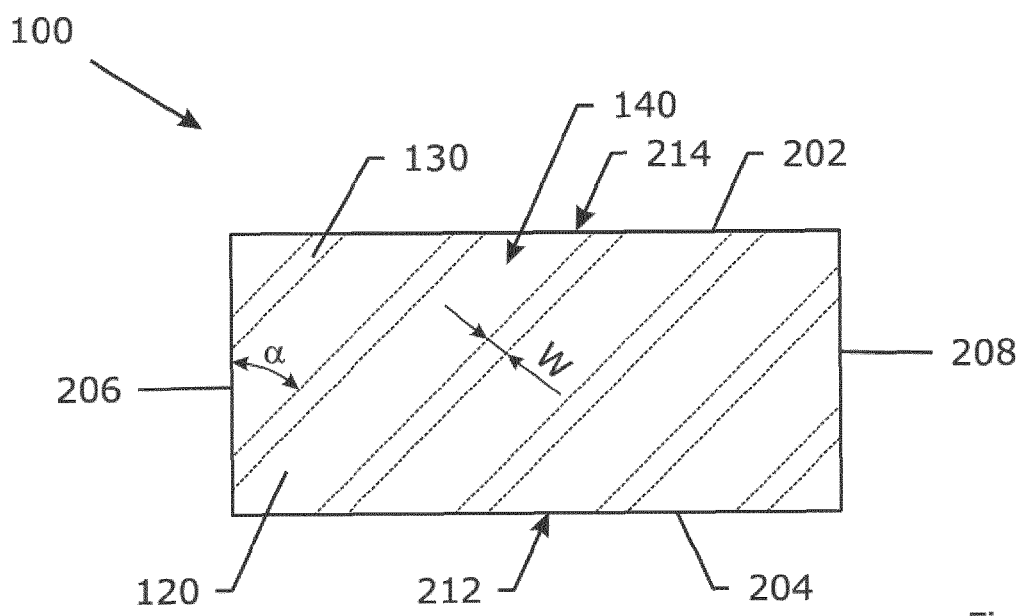

An example of a pre-fabricated construction panel 100 for use on an external surface and/or as part of a building or construction is shown in FIG. 1 and FIG. 2. The panel 100 comprises first layer 110 which is provided from thermally insulating material, in this embodiment a sheet of polyisocyanurate, at both sides covered with a water impermeable sheet of aluminum. The thermally insulating material has a substantially rectangular surface with height and width substantially equal to the dimensions of the fiber cement board of the second layer 120. The thickness of the thermally insulating material is about 60 mm, however may be more.

The panel comprises a second layer 120 being fiber cement board.

The fiber cement board has a substantially rectangular surface with height 2.5 meter and width of 1.22 meter. The thickness of the fiber cement board is 8 mm.

The fiber cement board is commercially available from Eternit NV as EQUITONE [Tectiva].

The fiber cement board is provided using the Hatschek process, after which the green fiber cement board is autoclave cured.

The fiber cement board is provided with water repellant properties by a water repellant surface hydrophobation. The surface is treated with a water based silane/silicone emulsion, e.g. the DOW CORNING® 520 dilutable water repellent.

These two layers are connected one to the other by a spacing means consisting in this embodiment of a set of adhesive stripes or beads 130, starting at one of the long sides of the panel 202, and running towards the opposite long side 204 of the panel. The direction of the stripes make an angle α with the short side 206 and 208 of the panel of about 45°. The stripes of adhesive, or adhesive beads, are provided between the first and second layer, hence adhere to one side 112 of the thermally insulating material and to one side 122 of the fiber cement board.

As such, interspaces 140, or air channels, are provided which has openings 212 and 214 to the external of the plate. As such these interspace openings 212 and 214 enable air to flow into and out of the interspace 140 towards the external of the plate.

Figure 3:
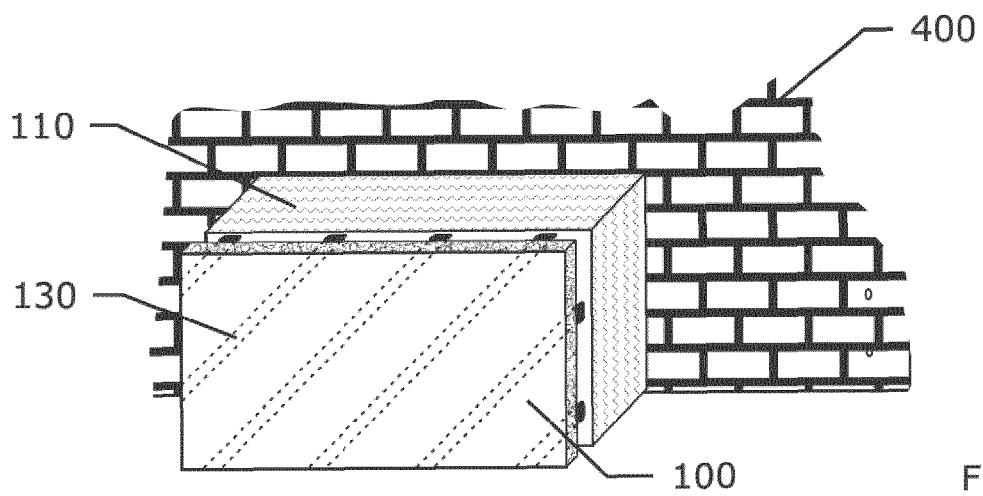
FIG. 3 shows schematically the panel of FIG. 1 when used to cover an external surface 400 of a building or construction.

The adhesive used are polyurethane, silicone based or modified silicone based adhesives. An example of a suitable polyurethane based adhesive is Sikabond® T55 available from Sika. An example of silicone-based or modified silicone polymers is the Silyl modified polymer (SMP)-based adhesive PanelTack HM of Bostik BV. The adhesive beads are applied such as to provide stripes with a thickness T of about 4 mm, the width W of the adhesive stripes is about 5 to 6 mm. The axial distance from one bead to the other is between 20 and 30 cm, preferably about 30 cm. As such, the beads cover about 1.5% of the surface of the surface of the fiber cement board hence leaves open 98.5% of the fiber cement board surface As shown in FIG. 3, the pre-fabricated construction panel 100 is used to cover an external surface 400 of a building or construction. The interspaces 140 create air circulating upwards or downwards between the two layers of the panel 100, while being inclined in view of the vertical under 45°.

Figure 4:
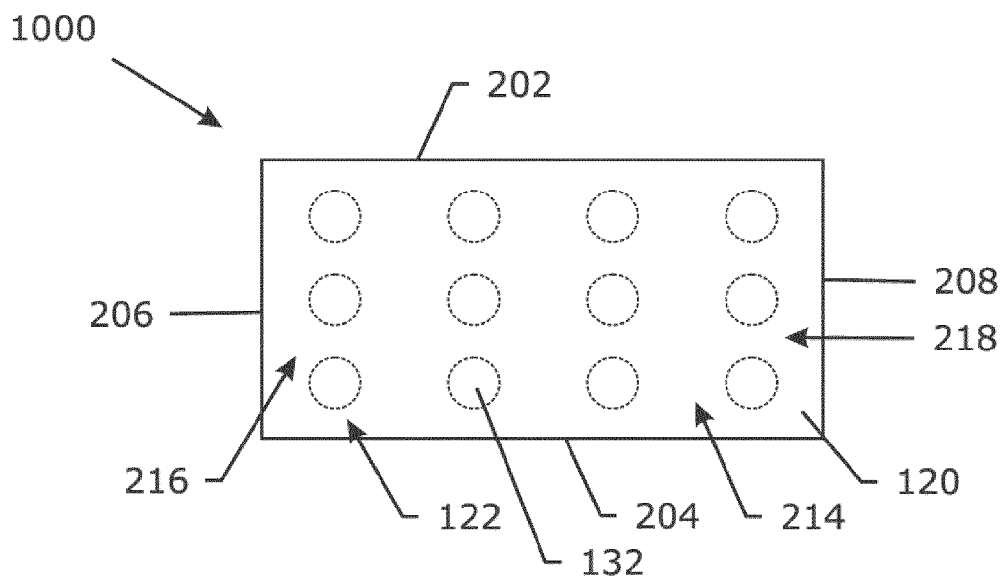
FIGS. 4 and 5 show schematically a side view and a top view of an other pre-fabricated construction panel for use on an external surface and/or as part of a building or construction.
Figure 5:
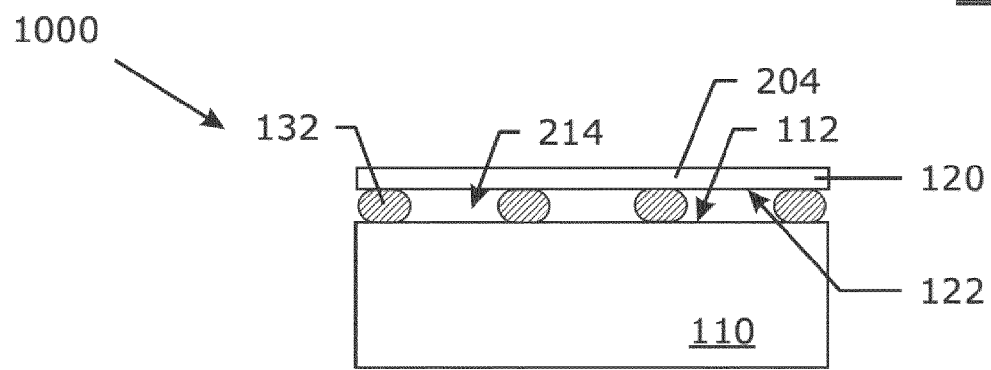

In an alternative embodiment of a pre-fabricated construction panel 1000 in top view shown in FIG. 4 and side view in FIG. 5, the adhesive is not provided as adhesive beads as shown in FIG. 1, but as individual blobs 132. As such one interspace 140 is provided, having openings 212, 214, 216 and 218 at all sides 202, 204, 206 and 208 of the panel 1000.

Figure 6:
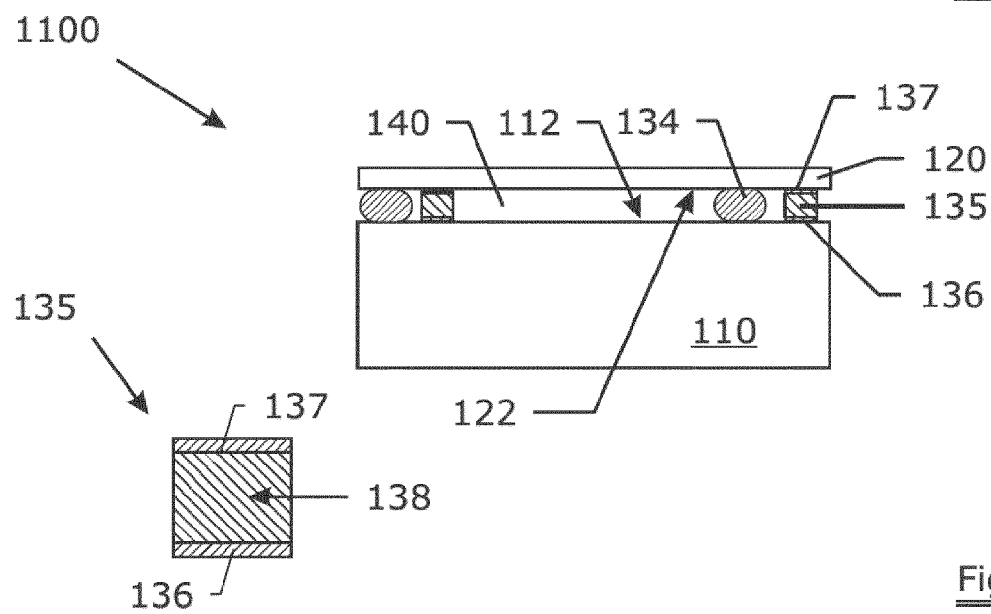
FIG. 6 shows schematically a side view of an other pre-fabricated construction panel for use on an external surface and/or as part of a building or construction.

In an alternative embodiment of a pre-fabricated construction panel 1100 in FIG. 6, the adhesive is not provided as adhesive beads only as shown in FIG. 1. The interspaces 140 are provided by using adhesive beads 134, provided adjacent to a bar 135, comprising a core 138 of polyurethane rigid or semi-rigid foam, and provided with adhesive 137 and 136 at the two sides of its substantially rectangular cross section which sides contact the sides 112 and 122.

During production of the panel 1100, the thermally insulating material 110 is provided, after which the bars 135 and the beads 132 are provided at the surface 112. The fiber cement board 120 is positioned, with its surface 122 facing towards the bars and beads, on the thermally insulating material 110. The two plates are now held to each other by the adhesion of the surfaces to the adhesive provided on the bars, while the adhesive beads are curing.

After curing the adhesion between the fiber cement board and the thermally insulating material is substantially provided by the adhesion of the beads.

All other dimensions and thicknesses can be held similar to the embodiment in FIG. 1. The surface covered by the spacing means however is somewhat more, as the surface of the beads and the surface of the bars cover some of the surface 112 and 122.

It is to be understood that although preferred embodiments and/or materials have been discussed for providing embodiments according to the present invention, various modifications or changes may be made without departing from the scope and spirit of this invention.

The invention claimed is:

1. A pre-fabricated construction panel (100) for use on an external surface and/tar as part of a building or construction, said panel (100) comprising
   at least a first layer (110) which is at least partially provided from thermally insulating material having a first surface (112),
   at least a second layer (120) being provided from fiber cement board and having a second surface (122) facing said first surface (112),
   said first and second layers (110, 120) being connected one to the other by spacing means located between and adhering to said first and said second surfaces (112, 122),
   said spacing means comprising a series of interspaces (140) sandwiched between the first and second surfaces (112, 122),
   said interspaces (140) each having two oppositely-positioned openings (212, 214) between the first and second layers (110, 120) to the exterior of said panel (100) at sides (202, 204, 206, 208) of said panel (100), for enabling air to flow into and out of the interspaces (140) towards the exterior of said panel (100), and
   adhesive beads (130) being provided from a structural gluing type adhesive contacting said first and second surfaces (112, 122) and extending between said first and second layers (110, 120) and continuously between the sides (202, 204, 206, 208) of said, panel (100) to define said interspaces (140) continuously therebetween, with
   said beads (130) and interspaces (140) all extending substantially parallel to one another,
   said first and second layers (110, 120) and beads (130) each formed from different material from one another, and
   said thermally insulating material having a thermal conductivity less than or equal to 0.05 W/mK, wherein
   the pre-fabricated construction panel (100) has a substantially rectangular shape having a first pair of said sides (202, 204) being substantially parallel and a second pair of said sides (206, 208) being substantially parallel,
   a length of said first pair of sides (202, 204) being longer than a length of said second pair of sides (206, 208), and
   the beads (130) and interspaces (140) being strips oriented at an angle with at least one of the pairs of sides (202, 204; 206, 208) between 40° and 60°.

2. A pre-fabricated construction panel according to claim 1, wherein an average distance (T) from the first to the second layer along the interspaces ranges from 2 mm to 10 mm.

3. A pre-fabricated construction panel according to claim 1, wherein the total surface area of a projection of the interspaces on said second surface of the at least second layer is 75% to 99% of the total surface area of said second surface.

4. A pre-fabricated construction panel according to claim 1, wherein
   said interspaces have openings (212, 214, 216, 218) at both sides of both pair of substantially parallel sides.

5. A pre-fabricated construction panel according to claim 1, wherein the fiber cement board is provided with water repellant properties.

6. A pre-fabricated construction panel according to claim 1, wherein the thermally insulating material (110) is a rigid foam.

7. A pre-fabricated construction panel according to claim 1, wherein the fiber cement board is an autoclave cured fiber cement board.

8. A The use of a pre-fabricated construction panel according to claim 1, positioned on to provide an external surface of a building or construction to direct airflow through said interspaces (140).

9. A method of providing an external surface of a building or construction, said method comprising: installing a pre-fabricated construction panel according to claim 1, wherein the first layer faces towards the external surface of the building or construction, and the second layer faces away from the external surface of the building or construction.

10. The method of claim 9 wherein the external surface is a wall.

11. The method of claim 9 wherein a finishing layer is provided on the surface of the second layer, facing away from the first layer.

12. The method of claim 11 wherein the finishing layer is a layer of paint or plaster.

13. A pre-fabricated construction panel according to claim 1, wherein the thermally-insulating material is a rigid foam, or a layered material comprising at least one of expanded or extruded polystyrene, a phenol-based foam, polyisocyanurate or polyurethane, or a layered material comprising two or more layers of expanded polystyrene, extruded polystyrene, polyisocyanurate or polyurethane, or has a water-impermeable sheet of aluminum at one or both surfaces thereof, and adhesive in said beads is a thermoplastic adhesive or silicone-based or modified silicone polymer.

14. A pre-fabricated construction panel (100) for use on an external surface and/or as part of a building or construction, said panel (100) comprising at least a first layer (110) which is at least partially provided from thermally insulating material having a first surface (112), at least a second layer (120) being provided from fiber cement board and having a second surface (122) facing said first surface (112), said first and second layers (110, 120) being connected one to the other by spacing means located between and adhering to said first and said second surfaces (112, 122), said spacing means comprising a series of interspaces (140) sandwiched between the first and second surfaces (112, 122), said interspaces (140) each having two oppositely-positioned openings (212, 214) between the first and second layers (110, 120) to the exterior of said panel (100) at sides (202, 204, 206, 208) of said panel (100), for enabling air to flow into and out of the interspaces (140) towards the exterior of said panel (100), and adhesive beads (130) being provided from a structural gluing type adhesive contacting said first and second surfaces (112, 122) and extending between said first and second layers (110, 120) and continuously between the sides (202, 204, 206, 208) of said panel (100) to define said interspaces (140) continuously therebetween, with said beads (130) and interspaces (140) all extending substantially parallel to one another, said first and second layers (110, 120) and beads (130) each formed from different material from one another, and said thermally insulating material having a thermal conductivity less than or equal to 0.05 W/mK, wherein said spacing means additionally comprise a rigid or semi-rigid bar (135) extending parallel to and adjacent each said bead (134), each said bar (135) having an adhesive (136, 137) sandwiching a core (138) therebetween and extending along a contact zone with said two surfaces (112, 122), and said bar (135) contacting said first and second surfaces (112, 122).

15. A pre-fabricated construction panel (100) according to claim 14, wherein said bar (135) is formed from natural or synthetic rubber or polymeric material such as polyvinyl chloride, and the fiber cement board has a water-repellent coating on a side facing away from said first layer (110) such as a water-based silane/silicone emulsion.

16. A pre-fabricated construction panel (100) according to claim 14, wherein the pre-fabricated construction panel (100) has a substantially rectangular shape having a first pair of said sides (202, 204) being substantially parallel and a second pair of said sides (206, 208) being substantially parallel, a length of said first pair of sides (202, 204) being longer than a length of said second pair of sides (206, 208), and the beads (130) and interspaces (140) being strips oriented at an angle with at least one of the pairs of sides (202, 204; 206, 208) between 40° and 60°.

17. A pre-fabricated construction panel according to claim 14, wherein an average distance (T) from the first to the second layer along the interspaces ranges from 2 mm to 10 mm.

18. A pre-fabricated construction panel according to claim 14, wherein the total surface area of a projection of the interspaces on said second surface of the at least second layer is 75% to 99% of the total surface area of said second surface.

19. A pre-fabricated construction panel according to claim 14, wherein the thermally-insulating material is a rigid foam, or a layered material comprising at least one of expanded or extruded polystyrene, a phenol-based foam, polyisocyanurate or polyurethane, or a layered material comprising two or more layers of expanded polystyrene, extruded polystyrene, polyisocyanurate or polyurethane, or has a water-impermeable sheet of aluminum at one or both surfaces thereof, and adhesive in said beads is a thermoplastic adhesive or silicone-based or modified silicone polymer.

20. A pre-fabricated construction panel according to claim 14, positioned on an external surface of a building or construction to direct airflow through said interspaces (140).

* * * * *